United States Patent [19]

Matthews et al.

[11] 4,211,303

[45] * Jul. 8, 1980

[54] SOUND ABSORBING DEVICE

[76] Inventors: Carl Matthews, 102 Gloucester Rd.; Elizabeth de Recourt Martyn, 37, Stanhope Gardens, both of London, England

[*] Notice: The portion of the term of this patent subsequent to Jul. 8, 1997, has been disclaimed.

[21] Appl. No.: 888,872

[22] Filed: Mar. 22, 1978

Related U.S. Application Data

[63] Continuation-in-part of Ser. No. 763,547, Jan. 28, 1977, abandoned.

[30] Foreign Application Priority Data

Feb. 3, 1976 [GB] United Kingdom ................ 4258/76
Apr. 28, 1977 [GB] United Kingdom .............. 17796/77

[51] Int. Cl.$^2$ .............................................. F01N 1/24
[52] U.S. Cl. ................................ 181/248; 181/252; 181/258; 181/296
[58] Field of Search ............... 181/222, 224, 247, 252, 181/257, 258, 256, 284, 294, 296, 227, 248, 198; 138/40, DIG. 2

[56] References Cited

U.S. PATENT DOCUMENTS

| | | | |
|---|---|---|---|
| 1,968,456 | 7/1934 | Kliefoth | 181/294 |
| 3,243,010 | 3/1966 | Flynn | 181/256 |
| 3,920,872 | 11/1975 | Ollinger | 181/284 |
| 3,954,031 | 5/1976 | Tull et al. | 181/198 |
| 3,955,643 | 5/1976 | Clark | 181/248 |

FOREIGN PATENT DOCUMENTS

| | | | |
|---|---|---|---|
| 2062687 | 6/1972 | Fed. Rep. of Germany | 181/252 |
| 542179 | 12/1941 | United Kingdom | |
| 563110 | 7/1944 | United Kingdom | 181/252 |

Primary Examiner—L. T. Hix
Assistant Examiner—Benjamin R. Fuller
Attorney, Agent, or Firm—Cushman, Darby & Cushman

[57] ABSTRACT

Acoustic energy is absorbed from a moving fluid by passing the fluid, which is typically a gas, through a liner comprising a closely woven textile-like material which serves as an acoustically transmitting inner lining. Anchored either directly or indirectly to the acoustically transmitting inner liner is a sound absorbing material the surface of which is covered with a multiplicity of fibers or filaments, each filament having one end attached directly or indirectly to the surface and its outer end free and contacting the inner wall of a casing in which the tube and sound absorbing material are contained. Automobile or marine mufflers or silencers effective in reducing or eliminating objectionable noise, but with only nominal back pressure, are disclosed.

13 Claims, 4 Drawing Figures

SOUND ABSORBING DEVICE

CROSS-REFERENCE TO RELATED APPLICATIONS

This application is a continuation-in-part of our application Ser. No. 763,547 filed Jan. 28, 1977, now abandoned.

SUMMARY OF THE INVENTION

The present invention relates to the selective absorption of acoustic energy from kinetic energy under conditions of relative motion between a surface and a fluid.

More particularly the invention provides means for absorbing acoustic energy from a fluid stream, such as a gas, which is a device having an outer surface and an internal wall containing therein a sound absorbing material past which the fluid stream can flow, preferably with minimal loss of kinetic energy due to surface resistance. The inner surface of the sound absorbing material is in the form of an acoustically transmitting inner liner or tube which is provided with a plurality of fibers or filaments of a relatively small diameter, each having one of its ends operatively attached, either directly or indirectly, to the inner liner and its outer end contacting against the interior wall of the outer casing.

The present invention, in its method aspect, provides for a method of absorbing acoustic energy from a moving fluid stream, usually a gas, by passing the fluid stream over and in contact with the liner as described above and preferably constructed of a closely woven textile material which, in turn, carries or contacts at least one surface of an investment of multiplicity of fibers or filaments of a relatively small diameter, all as described above. The method of the present invention also includes passing a moving fluid stream, such as a gas, over and in contact with a device of the type described above.

The invention is particularly useful, for example, in providing an exhaust system or portion of the exhaust system of any desired shape or configuration for an internal combustion engine such as a motor vehicle, marine craft or aircraft, and specifically as a replacement for a conventional automotive muffler.

The present invention also includes the use of the above-described arrangement as a portion of an air conditioning/heating duct which may be oval, square, circular or of any desired cross-sectional shape. The air passing through such a duct is able to flow with only minimal or no loss of kinetic energy due to surface resistance, while at the same time the flexing fibers or filaments against the inner wall of the duct or casing serves to silence or muffle the airflow.

According to one feature of the present invention, the fibers are preferably flexible, their free ends usually extending perpendicular to and in contact with inner wall of the casing in which they are contained.

The closely woven textile-like material has physical and chemical properties appropriate for their use in the environment in which they are situated. A preferred material is woven glass cloth which is capable of withstanding operational temperatures of up to at least 550° C.

The fibers may be of inorganic, metal-organic or any suitable material provided that the fibers possess physical and chemical properties appropriate for their integrity and survival for an acceptable period of use in the environment in which they are placed. Thus, for example, for endurance in an engine exhaust system of a marine craft where the exhaust gas is cooled, such as by water injection, the fibers may be of organic origin. By contrast, in the dry and uncooled conditions of the engine exhaust of an automobile, aircraft or the like, the fibers should preferably be of an inorganic material having a refractoriness and insolubility which are appropriate, and in this case could be of siliceous, ceramic, carbon or similar material. Conversely, they may be metallic, or a mixture of any one or more of the above. Selection of an appropriate fiber may be determined through preliminary experimentation by one skilled in the art. It is preferred that the average diameter of the fibers or filaments employed will be in the range of about 1 to about 50 microns in size.

DETAILED DESCRIPTION OF THE DRAWINGS

Figure 1:
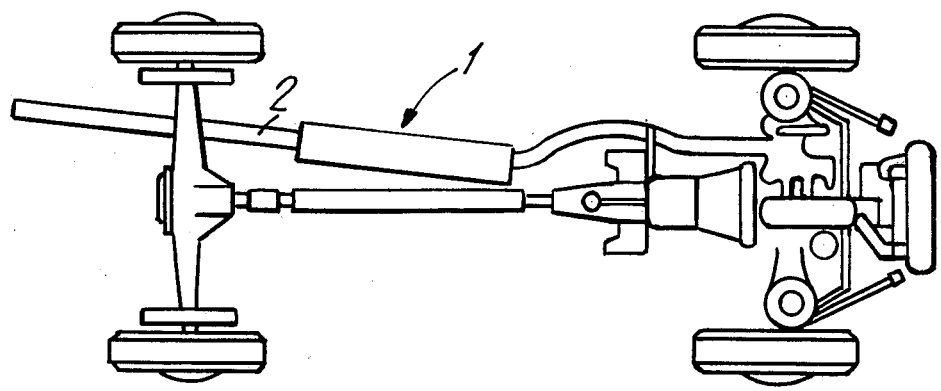
FIG. 1 is top view partial representation of an automobile showing a suggested positioning of the muffler of the present invention.

FIG. 1 depicts an automobile showing the layout of a typical muffler system. The muffler 1 of the present invention (which is shown and described in more detail below) may be situated anywhere along the exhaust line 2. The muffler may, if necessary, comprise more than one invested section. Although this figure shows muffler 1 as being of greater external diameter than exhaust pipe 2, the extention of this enlargement has been (for purpose of illustration) magnified. It is important that the internal space in muffler 1 should not be less than the average diameter of the exhaust line 2. In this way no constriction is built into the exhaust line and no additional back pressure is created.

Figure 2:
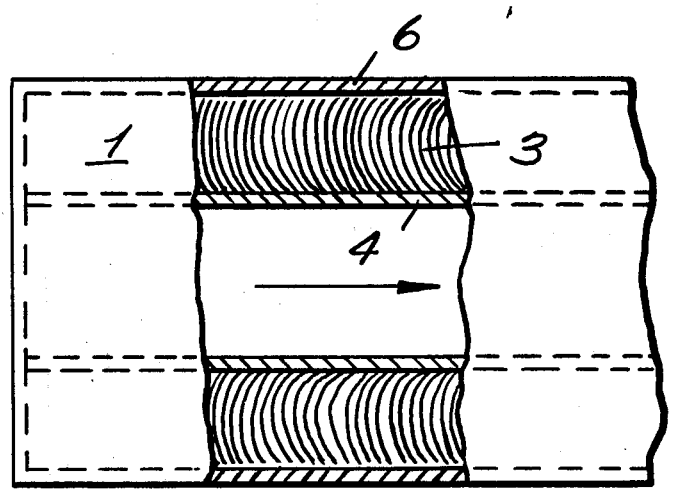
FIG. 2 is a partial broken-away cross-sectional view of one embodiment of a muffler as being illustrative of the present invention.

FIG. 2 is a partial broken away cross-sectional view of muffler 1 in which the fur investment 3 is bonded directly to an acoustically transmitting inner liner 4 which comprises a closely woven textile-like material. The loose ends of the fur investment 3 project away from the axis of the muffler and flexibly engage the inside wall of the muffler casing 6.

Figure 3:
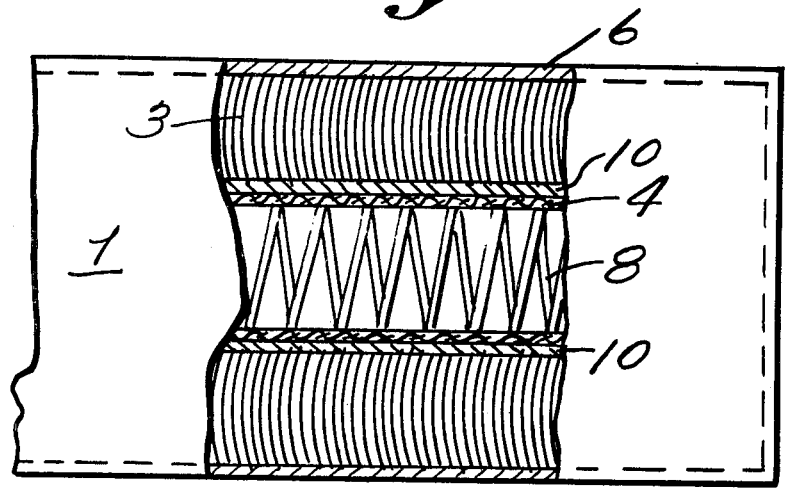
FIGS. 3 and 4 are partial broken-away cross-sectional views of additional embodiments of the present invention.

FIG. 3 is a partial broken-away cross-sectional view in which the acoustically transmitting liner 4 is supported by a wire coil 8 extending the length of the muffler 1 in conduit 6 upon the flow of fluid through the muffler casing. The loose ends of the fur investment 3 project away from the axis of the muffler and flexibly engage the inside wall of the muffler casing 6. Interposed between the fur investment 3 and the acoustically transmitting liner 4 is a sound absorbing fibrous mat 10.

Figure 4:
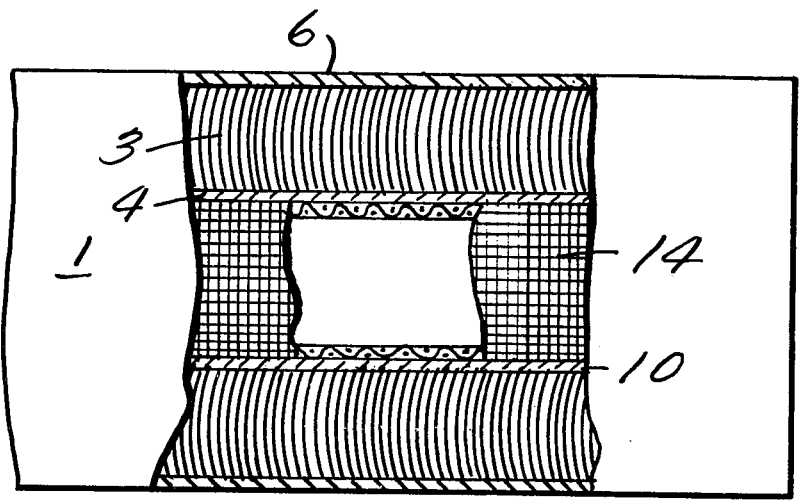

FIG. 4 shows a similar arrangement in which an open wire mesh 14 supports the acoustically transmitting inner liner 4.

DETAILED DESCRIPTION OF THE INVENTION

In FIG. 2, the interior wall of conduit 6, shown in an axial cross-section, is contacted with the free ends of an investment of flexible, uni-directional, closely spaced fibers 3 which have a general appearance of anitmate fur. The free ends of the fibers 3 extend substantially parallel and operatively contact the inner surface of muffler casing 6.

When the construction of the present invention is used in an automobile engine exhaust system, it has been found that the acoustic energy present in the gas can be absorbed to a very high degree without incurring any substantial decrease in the kinetic energy of the gas.

This device then provides an exhaust which can be totally silent or virtually totally silent with minimal back pressure, or at high velocities of flow, pressure of such low value that the engine maintains higher efficiency than is normally the case. This is an important feature of the present invention. A conventional automobile muffler reduces the noise made by the auto engine using a series of baffle plates, packings and walls inside of the muffler. In reducing noise a substantial amount of back pressure is created which decreases the overall efficiency of the engine. By reducing back pressure the overall operating efficiency and economy of the engine are improved.

While we have not fully elaborated the theory of operation of our invention, a reasonable explanation appears to be that, that alternating compression/depression waves of acoustic energy of both longitudinal and transverse propagation are absorbed by reason of the multiplicity of phase changes and this energy is apparently transformed into heat. Also a high viscosity is provided in the closely spaced fibers by the very great number of air columns of minute diameters which interspace the filaments, such columns being a factor in the acoustic energy absorption.

Taking an automobile exhaust system as an example, it is preferred that the closely woven textile-like material tube defines an opening of about the same cross-sectional area as that of the bore of an incoming exhaust line to allow the exhaust gases to flow without resistance.

The flexible textile-like woven material defines a passageway from the inlet to the outlet of the muffler and is generally in the form of a tube or similar configuration. Preferably, the woven material has a thickness of less than 2 mm and may be retained in place by suitable mechanical means, as discussed below, or supported by a network of rigid openwork material such as an open wire mesh gauze or a spiral coil of wire. The material selected should be woven tight enough to effectively preclude the adjacent sound absorbing material from obstructing the passageway of the fluid from the inlet to the outlet of the muffler.

The fibers may be mechanically or adhesively attached to the woven backing surface at the fiber roots or they may be secured to an intermediate backing layer and the backing layer fixed to the woven backing surface. When so attached an adhesive will be selected to be compatible with the fibers and capable of maintaining its integrity during conditions of operation. Depending on their composition they may, for example, be deposited electrochemically, cataphoretically, or by precipitation directly on the surface or on a suitable support which is attached to the conduit surface.

According to the various embodiments of the devices of our invention the fibers may extend perpendicularly from the internal tube and remain so over the whole of their length. With this arrangement, in use, the fluid flow may indirectly cause the fibers to bend over at some distance from their roots. So as to provide the optimum or most economical use of materials, a ratio will be established involving several factors such as the amount of incident energy and the statistical data relating to the fibers, population per unit area, density or specific gravity, Young's modulus, diameter, and length, particularly that part of the fiber investment which is parallel to the direction of the fluid flow, effective thickness or depth from the roots when in use, environment humidity, and the length of axial path invested with the fibers.

We have also found that a gas may be released silently yet at high velocity from the end of a conduit such as a compressed air line. For related physical reasons, organ piping is eliminated without reduction of rheological efficiency.

Our invention is not to be considered limited in any way to the silencing of an internal combustion engine as there are diverse areas in which the principles set forth above also apply. Other areas in acoustics where our technique may be applied are those where high noise level impulse waves are produced; the absorbent effect of the investment considerably chops down the initial oscilloscope deflection.

It will be appreciated that various changes and modifications of the above-described invention can be made, and, to the extent that such variations incorporate the spirit of this invention, they are included within the scope of the appended claims.

We claim:

1. An exhaust system for an internal combustion engine comprising:
   an exhaust pipe,
   conduit means operatively attached to said exhaust pipe for effectively absorbing the acoustic energy of fluid flowing through said exhaust pipe while allowing passage of the fluid therethrough so that negligible back pressure is provided under operating conditions, said conduit means having an inner and outer surface,
   said means comprising an inner liner of closely-woven textile-like acoustically transmitting material defining a fluid passageway having an inlet and an outlet therein disposed within said conduit and in line with said exhaust pipe, said liner provided with a plurality of fibers operatively attached to the outside surface of said inner liner and having the free ends of said fibers extending from said inner liner to which they are attached to the inner surface of said conduit, so that the free ends of said fibers are substantially parallel to, in operative contact with and flexibly engage the inner surface of said conduit means, said liner of generally the same cross-sectional area as the cross-sectional area of said exhaust pipe.

2. The exhaust system as claimed in claim 1 wherein said internal combustion engine is a motor vehicle internal combustion engine.

3. A device for absorbing acoustic energy from a moving fluid stream, said device comprising:
   conduit means operatively attached to said exhaust pipe for effectively absorbing the acoustic energy of fluid flowing through said exhaust pipe while allowing passage of the fluid therethrough so that negligible back pressure is provided under operating conditions, said conduit means having an inner and outer surface, said means comprising an inner liner of closely-woven textible-like acoustically transmitting material defining a fluid passageway having an inlet and an outlet therein disposed within said conduit and in line with said exhaust pipe, said liner provided with a plurality of fibers operatively attached to the outside surface of said inner liner and having the free ends of said fibers extending from said inner liner to which they are attached to the inner surface of said conduit, so that the free ends of said fibers are substantially parallel to, in operative contact with and flexibly engage the inner surface of said conduit means, said liner of generally the same cross-sectional area as the cross-sectional area of said exhaust pipe.

4. The device as claimed in claim 3 wherein said inner liner is woven glass fiber.

5. The device as claimed in claim 3 wherein said inner liner has a thickness of at most about 2 mm.

6. The device as claimed in claim 3 wherein said fibers have an average diameter of 1 to 50 microns.

7. The device as claimed in claim 3 wherein said conduit has a circular cross-section, and wherein said inner liner is also circular in cross-section and generally concentric with said conduit.

8. The device as claimed in claim 3 wherein said liner is supported by a spiral wire coil.

9. The device as claimed in claim 3 wherein a sound absorbing fiberous mat is positioned intermediate said inner liner and said plurality of fibers.

10. The device as claimed in claim 9 further comprising a means for retaining said mat in place in operative attachment to said inner liner.

11. The device as claimed in claim 3 further comprising a wire mesh for supporting said inner liner.

12. A method of absorbing acoustic energy from the exhaust system for an internal combustion engine comprising providing conduit means operatively attached to an engine exhaust pipe for effectively absorbing the acoustic energy and flowing exhaust fluid through said exhaust pipe while generating at most only negligible back pressure under operating conditions, said conduit means having an inner and outer surface, said means comprising an inner liner of closely-woven textile-like acoustically transmitting material defining a fluid passageway having an inlet and an outlet therein disposed within said conduit and in line with said exhuast pipe, said liner provided with a plurality of fibers operatively attached to the outside surface of said inner liner and having the free ends of said fibers extending from said inner liner to which they are attached to the inner surface of said conduit, so that the free ends of said fibers are substantially parallel to, contacting and flexing while engaging the inner surface of said conduit means, said liner of generally the same cross-sectional area as the cross-sectional area of said exhaust pipe.

13. A method of absorbing acoustic energy from a moving fluid stream, said method comprising:

providing conduit means operatively attached to an exhaust pipe for effectively absorbing the acoustic energy, flowing exhaust fluid through said exhaust pipe while allowing passage of the fluid therethrough so that negligible back pressure is provided under operating conditions, said conduit means having an inner and outer surface, said means comprising an inner liner of closely-woven textile-like acoustically transmitting material defining a fluid passageway having an inlet and an outlet therein disposed within said conduit and in line with said exhaust pipe, said liner provided with a plurality of fibers operatively attached to the outside surface of said inner liner and having the free ends of said fibers extending from said inner liner to which they are attached to the inner surface of said conduit, the free ends of said fibers substantially parallel to, contacting and felxibly engaging the inner surface of said conduit means, said liner of generally the same cross-sectional area as the cross-sectional area of said exhaust pipe.

* * * * *